Mar. 3, 1925.
W. D. MITCHELL
TRAP
Filed July 23, 1923
1,527,990
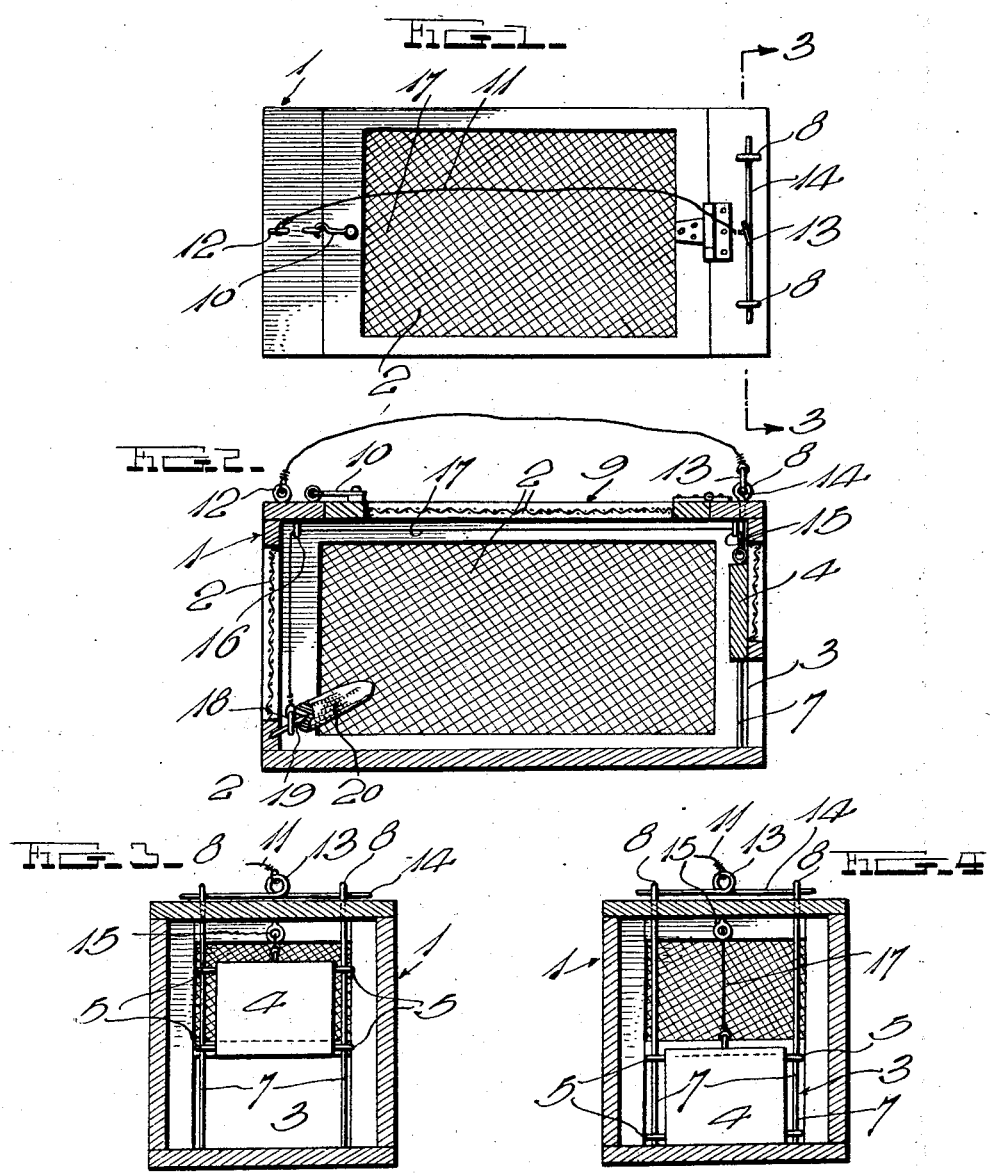
Witness
H. Woodard
Inventor
W. D. Mitchell
By H. B. Willson Yeo
Attorneys Patented Mar. 3, 1925.

1,527,990

UNITED STATES PATENT OFFICE.

WILLIAM D. MITCHELL, OF LIMA, OHIO.

TRAP.

Application filed July 23, 1923. Serial No. 653,268.

*To all whom it may concern:*

Be it known that I, WILLIAM D. MITCHELL, a citizen of the United States, residing at Lima, in the county of Allen and State of Ohio, have invented certain new and useful Improvements in Traps; and I do declare the following to be a full, clear, and exact description of the invention, such as will enable others skilled in the art to which it appertains to make and use the same.

My invention has reference to numerous kinds of traps but the present disclosure is directed primarily to one intended for catching rats.

One object of the invention is to provide a simple and inexpensive trap having improved means whereby it is held in set position until the bait is removed by the prey.

In carrying out the invention, a cage is provided having a sliding door movable downwardly to trapping position, and the top of the cage is provided with a door through which the catch may be removed, said door being also instrumental in easily setting the trap. A flexible carrying handle is provided for the cage and this handle extends over the top-carried door, a further object being to provide a novel means whereby one end of the handle is attached to the cage but may be easily detached therefrom to permit opening of the last named door.

Another object of the invention is to provide vertical guide rods for the slidable door of the trap and to form the upper ends of these rods with eyes which are instrumental in detachably connecting one end of the handle to the cage.

With the foregoing in view, the invention resides in the novel subject matter hereinafter described and claimed, the description being supplemented by the accompanying drawings.

Figure 1 is a top plan view of a trap constructed in accordance with my invention.

Fig. 2 is a central vertical longitudinal sectional view.

Fig. 3 is a vertical transverse sectional view as indicated by line 3—3 of Fig. 1.

Fig. 4 is a duplicate of Fig. 3 with the exception that it illustrates the door of the trap in closed position.

The cage of the trap selected for illustration in the present disclosure, is formed of a suitable frame 1 and a woven wire covering 2. The front of the cage is provided with an entrance opening 3 and a vertically slidable door 4 is employed to close said opening when an animal has entered the trap. Opposite edges of the door 4 are provided with eyes 5 slidable along a pair of vertical guide rods or wires 7 whose upper ends extend through the top of the cage and are bent to form a pair of horizontally alined eyes 8.

The top of the cage is equipped with a door 9 mounted hingedly or in any other desired manner and having a suitable latch 10. This door is instrumental in baiting the trap, as well as removing an animal which has been caught. Extending over the door 9, is a flexible handle 11 for carrying the device, one end of said handle being secured to the frame 1 as indicated at 12, while the other end of said handle is connected with an eye 13 formed centrally between the ends of a wire bolt 14 whose ends are insertable through the eyes 8. It will be seen that proper manipulation of the bolt will disconnect one end of the handle 11 from the cage and will thus permit this handle to be readily moved out of the way when it is desired to open the door 9.

For holding the door 4 in the normally raised position disclosed in Figs. 2 and 3, novel provision is made. An eye or other guide 15 is carried by the frame 1 above the door and a similar guide 16 is carried by the opposite end of the frame, and a flexible element 17 which is connected at one end with the door 4, is engaged with said guides and is provided on its other end with a ring 18. An inclined prong 19 is carried by the portion of the frame below the guide 16 and the ring 18 is adapted to be passed over said prong to hold the door 4 in raised position, said ring being held on said prong by an ear of corn 20 or other bait carried by the free end of the prong.

It will be seen that whenever a rat or other animal enters the cage and removes the bait 20 from the prong 19, the ring 18 will slide from said prong, thus releasing the door 4 and permitting the latter to close.

As excellent results are obtainable from the simple and inexpensive construction disclosed, this construction may be followed in a general way if desired. It is to be understood however, that within the scope of the invention as claimed, numerous changes may be made, particularly with regard to the details of the cage structure.

I claim:—

1. In a trap, means for holding the trap in set position comprising a rigid inclined prong adapted to hold bait on its free end, and a ring adapted to be held on said prong solely by the bait, said ring serving to release the trap when released from said prong by removal of the bait.

2. A trap comprising a cage having an inlet and a downwardly closable door therefor, a guide carried by the cage over said inlet and another guide at the end of the cage remote from said opening, an inclined prong in the cage below said other guide, a flexible element engaged with said guides and having one end attached to said door, and a ring on the other end of said flexible element adapted for passage over said prong to hold the door in raised position, said ring being retained on said prong solely by the bait and serving to release the door when the bait is removed.

3. A trap comprising a cage having a door in its top, a carrying handle attached at one end to said cage and extending over said door, a bolt to which the other end of said handle is connected, and a pair of eyes through which the ends of said bolt are insertable, said pair of eyes being carried by the cage.

4. A trap comprising a cage having a slidable animal door at one vertical side and another door at its top, a pair of vertical guide rods for said sliding door extending through the top of the cage and having their upper ends bent to form a pair of horizontally alined eyes, a carrying handle passing over the top-carried door and connected at one end to the cage, and a bolt to which the other end of the handle is connected, the ends of said bolt being insertable through said eyes.

In testimony whereof I have hereunto affixed my signature.

WILLIAM D. MITCHELL.